(12) United States Patent
Fischer

(10) Patent No.: US 6,371,069 B1
(45) Date of Patent: Apr. 16, 2002

(54) INTAKE DEVICE

(75) Inventor: Christian Fischer, Fellbach (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/684,956

(22) Filed: Oct. 5, 2000

(30) Foreign Application Priority Data

Oct. 8, 1999 (DE) ......................................... 199 48 660

(51) Int. Cl.$^7$ ............................................... F02N 35/10
(52) U.S. Cl. .............................. 123/184.55; 123/184.59
(58) Field of Search ........................ 123/184.55, 184.56, 123/184.59, 184.53

(56) References Cited

FOREIGN PATENT DOCUMENTS

| DE | 36 08 310 |   | 9/1987 |
| DE | 3843690 | * | 7/1990 |
| JP | 60-184924 | * | 9/1985 |
| JP | 2-291422 | * | 12/1990 |

* cited by examiner

Primary Examiner—Noah P. Kamen
(74) Attorney, Agent, or Firm—Crowell & Moring LLP

(57) ABSTRACT

An air intake device (10) especially adapted for use with an internal combustion engine, which achieves longer air intake tubes using a very simple geometry and which directly guides aspirated air without sharp deflections. The air intake device comprises a manifold (11), intake tubes (12), and an adjusting unit (13). The manifold (11) and the adjusting unit (13) form air intake channels (14), each leading into an air intake tube. The air intake channels (14) are arranged in a "cloverleaf" about the adjusting unit (13). To achieve an optimum charging of the cylinders of an internal combustion engine in all speed ranges, the adjusting unit (13) is steplessly or continuously adjustable. To establish preferred settings, rotary or sliding sleeves with interruptions can be integrated into the air intake device.

17 Claims, 2 Drawing Sheets

INTAKE DEVICE

BACKGROUND OF THE INVENTION

The invention relates to an intake device containing a manifold, at least one air intake passage, an air intake tube for each passage connected to the respective air intake passage, and an adjusting unit.

A device for the continuous variation of the length of the air intake tube of an internal combustion engine is disclosed in DE 36 08 310. The device comprises a stationary housing serving as a manifold in which a hollow cylindrical rotor body is disposed for rotation, the interior of which is connected to the air intake tube through a connection opening. Ducts separated from one another are defined between the outer circumference of the rotor body and the inner wall of the housing in the radial direction and between the sealing walls in the axial direction, and their effective length is determined by the rotational position of an outlet opening in the rotor body wall, which leads to the interior of the rotor body. On the other hand, each duct leads to an inlet opening of an intake passage leading to each cylinder of the internal combustion engine. Rotation of the rotor body varies the effective length of each duct according to the speed of the internal combustion engine at full load.

In this device, however, the intake duct length is limited by the maximum possible rotor body circumference. Furthermore, upon issuing from the rotor body the fluid is extremely deflected.

SUMMARY OF THE INVENTION

It is the object of the invention to provide an intake device which make it possible to achieve long intake duct lengths.

Another object of the invention is to provide an intake device which requires less deflection of the aspirated air than prior art devices.

These and other objects of the invention have been achieved by providing an air intake system for an internal combustion engine, comprising an air intake manifold wherein a portion of the air intake manifold is divided into a plurality of air intake channels, each of the air intake channels being connected at one end to a respective air intake tube, and an adjusting member arranged to extend into the air intake manifold, the adjusting member being movable between a first position in which the air intake channels open to each other, whereby the effective lengths of the respective air intake tubes are shortened, and a second position in which the air intake channels are separated from each other, whereby the effective lengths of the respective air intake tubes are lengthened.

In accordance with another preferred aspect of the invention, the objects are also achieved by providing an air intake apparatus comprising a manifold, at least one air intake channel in the manifold, an air intake tube connected to each respective air intake channel, and an adjusting unit, wherein the adjusting unit comprises a movable adjusting element which extends into the manifold; wherein the manifold, the at least one air intake passage, and the adjusting element are arranged axially parallel; and wherein the at least one air intake passage is formed by the manifold and the adjusting element.

The intake device according to the invention is advantageously able to achieve great intake lengths with only slight deflection of the medium entering it and deliver it to an internal combustion engine.

The intake device comprises a manifold which envelops a manifold chamber and forms a portion of the intake channels or passages. Into this manifold an adjusting unit extends which is mounted in guides provided therefor and which together with the manifold forms the intake channels or passages. The adjusting unit is mounted in the container in a sufficiently sealed or gas-tight manner that the individual intake passages are separate. The separation of the passages from one another can be accomplished by the interaction of the container with the adjusting unit. Each intake channel or passage, which is to be understood as the adjustable length, is connected to an intake tube which has an invariable length. The intake tube opens into a cylinder of the internal combustion engine. The manifold, the adjusting unit and the intake channel or passage are arranged axially parallel. Since the intake device is to be placed in different installation spaces it can follow many different spatial curves, with the spatial curves of the intake passages and the adjusting unit running parallel. The adjusting unit of a straight embodiment can be constructed of a rigid or stiff material. In curved embodiments, to assure proper assembly, the adjusting unit may either be made of flexible material or of material provided with solid inserts, or of stiff material with flexible inserts. In some embodiments it may be desirable to use a multi-part adjusting unit or a plurality of adjusting units in order to assure proper assembly and operation or to achieve certain effects. The manifold can be made as a blow-molded plastic part, or in the case of complicated forms, it can be made by a core melting process.

In accordance with one preferred embodiment, the adjusting unit has portions in which it forms a surface of contact with the manifold. The adjusting unit is arranged so that it is displaceable relative to the manifold. When the adjusting unit is shifted to extend into the interior of the manifold, the manifold chamber is reduced and the effective passage length of the combined tubes and channels is lengthened. By displacing the adjusting unit in the opposite direction the manifold chamber in the manifold is increased and thus the air intake passage length is reduced. The external volume of the manifold is constant; the intake passage length is thus variable and can be adjusted to match the state of operation of the internal combustion engine. To be able to fix preferred settings precisely, e.g. for certain rotatory speeds, rotary or sliding sleeves can be provided which have openings which fix the adjusting unit at the desired position.

In accordance with another preferred embodiment of the invention, the adjusting unit can be shifted by translation. In this embodiment, the adjusting unit is retracted or drawn axially out of the manifold to a certain length, and then the intake passage length is shortened and the size of the manifold is enlarged by this amount. When the adjusting unit is moved inwardly into the manifold the intake passage length is increased by the amount of the inward movement.

One advantageous embodiment of the invention is a "clover-leaf" arrangement of air intake passages around an adjusting unit. This construction results in an equal distribution of pressure in the manifold. With this arrangement a compact structure is possible, since the wall of each intake channel or passage also forms in part the wall of the adjacent intake channel or passage.

In one preferred embodiment, the adjusting unit may advantageously be formed from a plurality of interconnected segments. With this type of construction the adjusting unit, after being drawn out of the manifold, can be reversed or wound up. For this purpose, springs may be used as connecting means, whose spring rates can be varied individually depending on the requirements of the given situation. Another possibility for joining the segments is to use flexible synthetic resin members, especially elastomers, or to use mechanical joints, such as ball joints.

Another embodiment of the invention involves the use of a adjusting unit which remains mostly in the manifold and which is formed by segments joined together by springs. The successive springs have a stiffness which increases from the manifold chamber toward the air intake tube. The springs are stretched by pulling on one end of the adjusting unit. The spring with the least stiffness is the first to stretch. The segments thus move apart from one another and the air intake channels or passages are provided in this area with a connection through which air can pass. The greater the force with which the adjusting unit is pulled, the greater is the number of segments that open a connection between the channels or passages. Since air can pass through these connections, the effective length of the air intake channel is shortened to the range in which the segments tightly adjoin one another. The points of contact between the individual segments can be of different kinds. The segments can have blunt ends which abut against one another, in which case a sufficient sealing of the individual intake passages from one another must be assured. Another possibility is the use of telescoping segments which are guided into one another and when opened have gaps which short-circuit the air intake channels or passages.

According to another embodiment of the invention, the air intake passages are sealed from one another along their axial lengths by a gasket, resulting in a better charging of the cylinders. The gasket can be in the form of a sealing cage comprising a plurality of sealing surfaces, or the gasket can be configured as an insert for individual sealing surfaces. An inlaid gasket can be installed in the adjusting unit as well as in the manifold.

One advantageous and low-cost variant is the manufacture of the manifold by the injection molding of plastic. In this case curvatures can be achieved, but attention must be paid to the stripping of the parts from the molds. In the case of complicated shapes the manifold can have several parts which are then welded together with air-tight joints.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
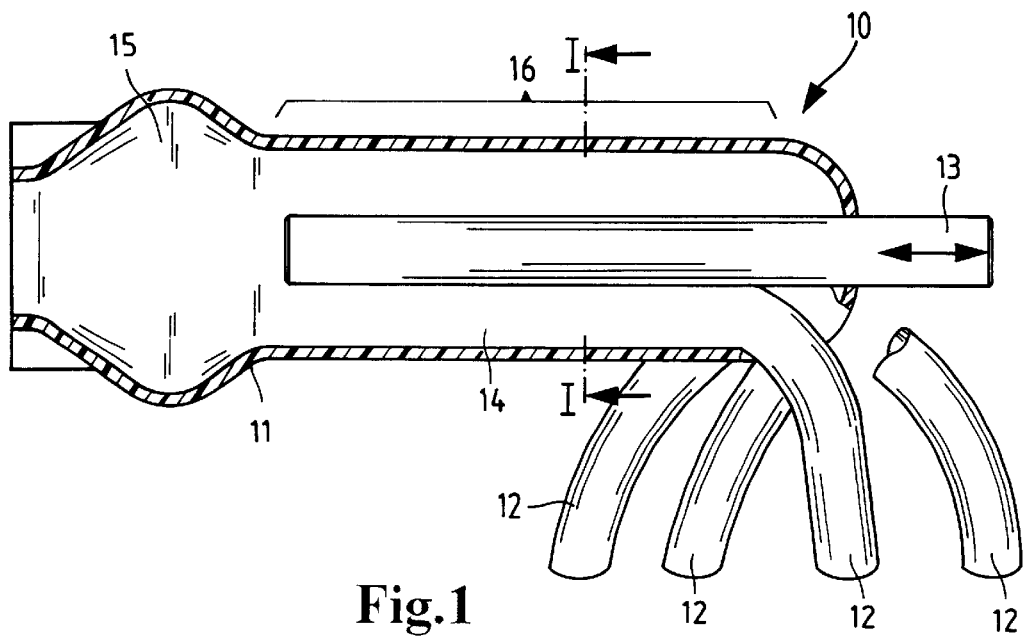
FIG. 1 is a sectional view of a preferred embodiment of an air intake device according to the invention.

In FIG. 1 an air intake device 10 is shown in section. This intake device 10 has a manifold 11, intake tubes 12 and an adjusting unit 13. Each intake tube 12 is connected to an intake channel or passage 14 which is formed by the manifold 11 in connection with the adjusting unit 13. The manifold envelops a chamber 15 which merges directly with the intake channels 14. To produce intake passage lengths that will always be optimal for various rotational speeds of an internal combustion engine, the adjusting unit can be shifted lengthwise. If the adjusting unit 13 is partially retracted out of the manifold 11 the chamber 15 is enlarged and the intake passage length 16 is reduced. If the adjusting unit 13 is shifted inwardly the chamber 15 is reduced and the intake passage length 16 is increased.

Figure 2:
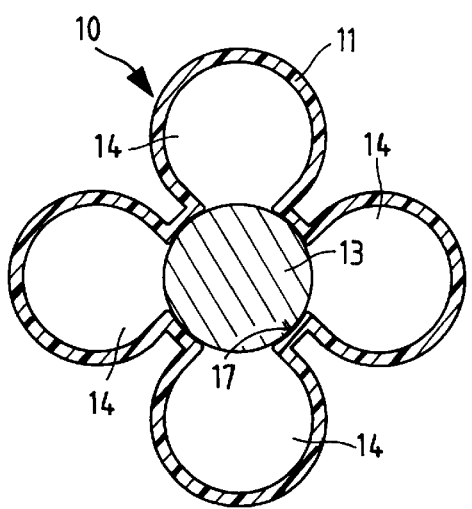
FIG. 2 is a sectional view of the intake device taken along line I—I of FIG. 1.

In FIG. 2 the air intake device 10 is illustrated in a sectional view taken along line I—I of FIG. 1. The air intake channels or passages 14 are arranged in a "clover leaf" with the adjusting unit 13 in a central area between them. The manifold 11 forms the outer wall and the adjusting unit 13 the inner wall of the air intake channels or passages 14. The manifold 11 forms with adjusting element 13 a contact surface 17 which provides a sufficient sealing of the air intake channels or passages 14 relative to one another.

Figure 3:
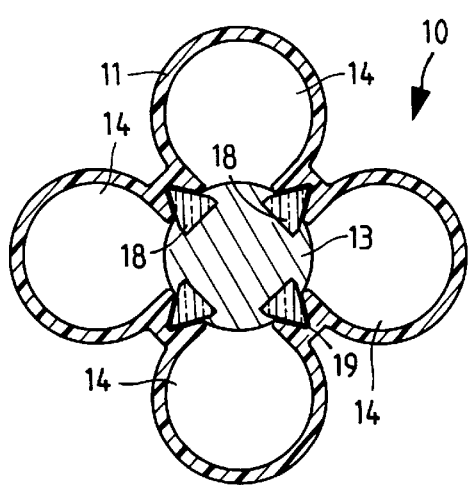
FIG. 3 is a sectional view taken along line I—I of FIG. 1 of a variant embodiment of an air intake device according to the invention with means for sealing the intake passages relative to one another.

In FIG. 3 the air intake device is shown in a section taken along line I—I of FIG. 1, in a variant sealing of the intake passages 14 by means of gaskets 18. These gaskets 18 are installed sealingly in the adjusting unit 13 and have a sealing edge 19 which is guided sealingly in the manifold 11.

Figure 4:
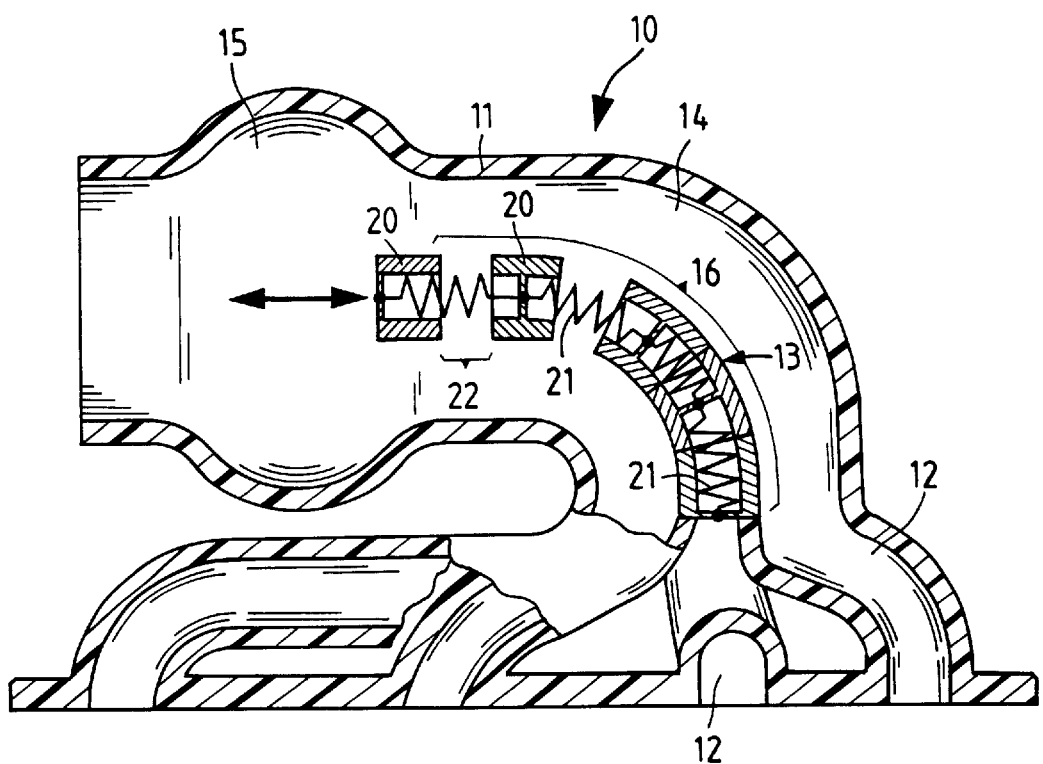
FIG. 4 is a sectional view of another embodiment of an intake device according to the invention.

FIG. 4 is a sectional illustration of an air intake device 10 according to the invention which comprises a manifold 11 with a chamber 15, an adjusting unit 13 and air intake tubes 12 adjoining the air intake passages 14. The adjusting unit is constructed of segments 20 which are connected by springs 21. The spring stiffness of successive springs increases from the chamber 15 to the intake tubes 12. In this construction, first the springs with the lower spring constant expand and open up the junctions 22 between the individual intake passages. Air passes through these junctions 22 and thus shortens the effective intake passage length 16. The more the springs expand, the more junctions 22 are opened and the more the intake passage length 16 is shortened. The springs 21 are inserted under tension between the segments 20 in order to bias the segments against each other. This assures that the segments 20 will join together sealingly in the unloaded state and will be brought sealingly together again after they are spread apart. The manifold 11 is designed such that the segments 20 are guided and no leakage from one intake channel 14 to the other can occur.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake system for an internal combustion engine, comprising an air intake manifold wherein a portion of said air intake manifold is divided into a plurality of air intake channels, each of said air intake channels being connected at one end to a respective air intake tube, and an adjusting member arranged to extend into said air intake manifold, said adjusting member being movable between a first position in which the air intake channels open to each other, whereby the effective lengths of the respective air intake tubes are shortened, and a second position in which the air intake channels are separated from each other, whereby the effective lengths of the respective air intake tubes are lengthened.

2. An air intake system according to claim 1, wherein said air intake channels are parallel and the adjusting member is arranged in a central area between the air intake channels and extends parallel to the channels; the adjusting member in the first position allowing lateral communication between the parallel air intake channels, and in the second position preventing lateral communication between the parallel air intake channels.

3. An air intake system according to claim 2, wherein the air intake channels are arranged in a clover leaf arrangement.

4. An air intake system according to claim 2, wherein a gasket is arranged between the adjusting member and said central area.

5. An air intake system according to claim 4, wherein the gasket is mounted on a surface of the adjusting member and extends axially along the adjusting member.

6. An air intake system according to claim 4, wherein the gasket is mounted on air intake manifold and extends parallel to the air intake channels along a surface of the manifold which faces the adjusting member.

7. An air intake system according to claim 1, wherein the adjusting member is a solid member which can be extended into a passageway between the channels to separate the channels or can be retracted from between the channels to open the channels to each other through the passageway.

8. An air intake system according to claim 7, wherein said adjusting member is continuously adjustable to any intervening position between said first position and said second position, whereby the effective length of the intake tubes can be continuously varied between maximum and minimum values.

9. An air intake system according to claim 1, wherein the adjusting member comprises a plurality of segments which are connected together.

10. An air intake system according to claim 9, wherein adjacent segments of the adjusting member are connected axially end-to-end by tension springs.

11. An air intake system according to claim 10, wherein successive springs increase progressively in stiffness with the spring nearest the air intake tubes having the greatest stiffness and the spring farthest from the air intake tubes having the least stiffness, whereby when the adjusting member is moved, adjacent segments of the adjusting member will separate successively to progressively open up passages between the channels.

12. An air intake system according to claim 1, wherein said manifold including said air intake channels and said air intake tubes comprise a one-piece synthetic resin part.

13. An air intake system according to claim 12, wherein said one-piece synthetic resin part is an injection molded part.

14. An air intake system according to claim 12, wherein said one-piece synthetic resin part comprises a plurality of molded parts welded together to a unitary member.

15. An air intake apparatus comprising a manifold least one air intake channel in said manifold, an air intake tube connected to each respective air intake channel, and an adjusting unit; wherein the adjusting unit comprises a movable adjusting element which extends into the manifold; wherein the manifold, the at least one air intake passage, and the adjusting element are arranged axially parallel; wherein the at least one air intake passage is formed by the manifold and the adjusting element, and wherein said apparatus comprises four air intake passages in a clover leaf arrangement.

16. An air intake apparatus comprising a manifold, at least one air intake channel in said manifold, an air intake tube connected to each respective air intake channel, and an adjusting unit, wherein the adjusting unit comprises a movable adjusting element which extends into the manifold; wherein the manifold, the at least one air intake passage, and the adjusting element are arranged axially parallel; wherein the at least one air intake passage is formed by the manifold and the adjusting element; wherein said adjusting unit comprises a plurality of segments connected axially end-to-end; wherein said segments are connected by tension springs and wherein successive springs increase progressively in stiffness from one end of the adjusting unit to the other.

17. An air intake apparatus comprising a manifold, at least one air intake channel in said manifold, an air intake tube connected to each respective air intake channel, and an adjusting unit, wherein the adjusting unit comprises a movable adjusting element which extends into the manifold; wherein the manifold, the at least one air intake passage, and the adjusting element are arranged axially parallel; wherein the at least one air intake passage is formed by the manifold and the adjusting element, and wherein said apparatus comprises a plurality of air intake channels and a like number of gaskets extending along said channels for sealing said channels from one another.

* * * * *